(12) United States Patent
Song et al.

(10) Patent No.: US 10,554,362 B2
(45) Date of Patent: *Feb. 4, 2020

(54) SYSTEM AND METHOD OF PROCESSING ANTENNA CONFIGURATION INFORMATION

(71) Applicant: HUAWEI TECHNOLOGIES CO., LTD., Shenzhen, Guangdong (CN)

(72) Inventors: Weiwei Song, Shenzhen (CN); Yinghui Yu, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

This patent is subject to a terminal disclaimer.

(21) Appl. No.: 16/009,214

(22) Filed: Jun. 15, 2018

(65) Prior Publication Data

US 2018/0294931 A1 Oct. 11, 2018

Related U.S. Application Data

(63) Continuation of application No. 15/155,083, filed on May 16, 2016, now Pat. No. 10,033,502, which is a
(Continued)

(51) Int. Cl.
*H04B 7/00* (2006.01)
*H04L 5/00* (2006.01)
(Continued)

(52) U.S. Cl.
CPC .......... *H04L 5/005* (2013.01); *H04B 17/382* (2015.01); *H04L 5/0023* (2013.01); *H04W 36/0072* (2013.01); *H04W 36/0094* (2013.01)

(58) Field of Classification Search
CPC .. H04L 5/005; H04B 17/382; H04W 36/0072; H04W 36/0094
(Continued)

(56) References Cited

U.S. PATENT DOCUMENTS 6,298,219 B1 10/2001 Patronen et al.
7,194,286 B2 3/2007 Lozano et al.
(Continued)

FOREIGN PATENT DOCUMENTS

CN 1450742 A 10/2003
CN 1825992 A 8/2006
(Continued)

OTHER PUBLICATIONS

3GPP TSG-RAN WG1 #49 Tdoc R1-072282,"Mobility and CQI Measurements in Mixed Unicast/MBSFN Carriers", Nokia Siemens Networks, Nokia, May 7-11, 2007,total 4 pages.
(Continued)

*Primary Examiner* — Dmitry Levitan
(74) *Attorney, Agent, or Firm* — Huawei Technologies Co., Ltd.

(57) ABSTRACT

A base station encodes antenna configuration information of a neighboring cell of a first cell, and sends encoded information relating to the antenna configuration information of the neighboring cell to a user equipment (UE). The UE is capable of communicating with the base station in the first cell. The UE receives the encoded information; decodes the antenna configuration information of the neighboring cell from the encoded information; and performs determination of predetermined time-frequency resource according to the antenna configuration information of the neighboring cell. The predetermined time-frequency resource is used by a base station of the neighboring cell for transmitting pilot measurement information.

20 Claims, 5 Drawing Sheets

Related U.S. Application Data continuation of application No. 14/025,626, filed on Sep. 12, 2013, now Pat. No. 9,344,244, which is a continuation of application No. 13/181,664, filed on Jul. 13, 2011, now Pat. No. 8,559,954, which is a continuation of application No. PCT/CN2009/070132, filed on Jan. 13, 2009.

(51) Int. Cl.
    *H04W 36/00*     (2009.01)
    *H04B 17/382*     (2015.01)

(58) Field of Classification Search
    USPC .................. 370/310, 328, 329, 330, 334
    See application file for complete search history.

(56) References Cited

U.S. PATENT DOCUMENTS

| | | | |
|---|---|---|---|
| 7,336,953 B2* | 2/2008 | Kim .................. | H04W 36/0085 455/438 |
| 8,031,679 B2 | 10/2011 | Shaik et al. | |
| 8,331,476 B2 | 12/2012 | Jongren et al. | |
| 8,559,954 B2 | 10/2013 | Song et al. | |
| 8,599,705 B2 | 12/2013 | Agrawal et al. | |
| 8,620,310 B2 | 12/2013 | Song et al. | |
| 8,942,696 B2 | 1/2015 | Vukajlovic et al. | |
| 2003/0153360 A1 | 8/2003 | Burke | |
| 2004/0157637 A1 | 8/2004 | Steer et al. | |
| 2004/0176094 A1 | 9/2004 | Kim et al. | |
| 2005/0249319 A1 | 11/2005 | Suh et al. | |
| 2005/0271157 A1 | 12/2005 | Van Zelst et al. | |
| 2006/0092884 A1 | 5/2006 | Wild et al. | |
| 2006/0203746 A1 | 9/2006 | Maggenti et al. | |
| 2007/0116095 A1 | 5/2007 | Gerlach | |
| 2008/0043637 A1 | 2/2008 | Rahman | |
| 2008/0165836 A1 | 7/2008 | Landau et al. | |
| 2008/0188215 A1 | 8/2008 | Bergstroem et al. | |
| 2008/0192872 A1 | 8/2008 | Lindoff | |
| 2009/0016303 A1 | 1/2009 | Shaik et al. | |
| 2009/0047950 A1 | 2/2009 | Doppler et al. | |
| 2010/0034314 A1 | 2/2010 | Brown et al. | |
| 2010/0061333 A1 | 3/2010 | Marsh et al. | |
| 2010/0165930 A1 | 7/2010 | Zangi | |
| 2010/0184458 A1 | 7/2010 | Fodor et al. | |
| 2010/0239034 A1 | 9/2010 | Lee et al. | |
| 2011/0117925 A1 | 5/2011 | Sampath et al. | |
| 2011/0274067 A1 | 11/2011 | Lee et al. | |
| 2013/0322341 A1 | 12/2013 | Nelson, Jr. et al. | |

FOREIGN PATENT DOCUMENTS

| | | |
|---|---|---|
| CN | 1855769 A | 11/2006 |
| CN | 1913386 A | 2/2007 |
| CN | 1972151 A | 5/2007 |
| CN | 101084692 A | 12/2007 |
| CN | 101171804 A | 4/2008 |
| CN | 101296503 A | 10/2008 |
| CN | 101313488 A | 11/2008 |
| EP | 1458209 A2 | 9/2004 |
| EP | 1780968 A1 | 5/2007 |
| JP | 2001298762 A | 10/2001 |
| KR | 20080016947 A | 2/2008 |
| WO | 2008060236 A2 | 5/2008 |
| WO | 2008098980 A1 | 8/2008 |

OTHER PUBLICATIONS

3GPP TSG-RAN WG1 LTE Ad Hoc Meeting R1-060042,"SCH Structure and Cell Search Method in E-UTRA Downlink",NTT DoCoMo et al.,Jan. 23-25,2006,total 10 pages.

TSG-RAN WG1 #49 R1-072460,"Measurements and MBMS (MBSFN) subframes",Ericsson,May 7-11,2007,total 2 pages.

3GPP TS 36.211 V8.5.0,3rd Generation Partnership Project;Technical Specification Group Radio Access Network; Evolved Universal Terrestrial Radio Access (E-UTRA); Physical Channels and Modulation(Release 8), Dec. 2008,total 82 pages.

3GPP TS 36.214 V8.5.0,3rd Generation Partnership Project;Technical Specification Group Radio Access Network; Evolved Universal Terrestrial Radio Access (E-UTRA);Physical layer—Measurements(Release 8),Dec. 2008, total 11 pages.

3GPP TS 36.300 V8.7.0,3rd Generation Partnership Project;Technical Specification Group Radio Access Network; Evolved Universal Terrestrial Radio Access (E-UTRA) and Evolved Universal Terrestrial Radio Access Network (E-UTRAN);Overall description;Stage 2(Release 8),Dec. 2008,total 144 pages.

3GPP TS 36.331 V8.4.0,3rd Generation Partnership Project;Technical Specification Group Radio Access Network; Evolved Universal Terrestrial Radio Access (E-UTRA)Radio Resource Control (RRC);Protocol specification(Release 8), Dec. 2008,total 197 pages.

3GPP TS 36.423 V8.4.0,3rd Generation Partnership Project;Technical Specification Group Radio Access Network; Evolved Universal Terrestrial Radio Access Network (E-UTRAN);X2 application protocol (X2AP)(Release 8), Dec. 2008,total 89 pages.

\* cited by examiner

SYSTEM AND METHOD OF PROCESSING ANTENNA CONFIGURATION INFORMATION

CROSS REFERENCE TO RELATED APPLICATIONS

This application is a continuation of U.S. patent application Ser. No. 15/155,083, filed on May 16, 2016. The U.S. patent application Ser. No. 15/155,083 is a continuation of U.S. patent application Ser. No. 14/025,626, filed on Sep. 12, 2013, now U.S. Pat. No. 9,344,244. The U.S. patent application Ser. No. 14/025,626 is a continuation of U.S. patent application Ser. No. 13/181,664, filed on Jul. 13, 2011, now U.S. Pat. No. 8,559,954. The U.S. patent application Ser. No. 13/181,664 is a continuation of International Application No. PCT/CN2009/070132, filed on Jan. 13, 2009. The afore-mentioned patent applications are hereby incorporated by reference in their entireties.

FIELD OF THE TECHNOLOGY

The present application relates to the field of communication technology, and more particularly to a system and a method of processing antenna configuration information.

BACKGROUND

When it is needed to reselect a cell or handover from a current cell to a neighboring call for a user equipment (UE), the UE needs to detect signal quality of the neighboring cell and send a detection result to a base station of the current cell. Operations such as cell handover or reselection are performed on the UE by the base station of the current cell according to the detection result.

In a wireless communication system, there may be multiple transmitter antennas in one cell, and coverage of different transmitter antennas may vary. In order to ensure the accuracy of the cell signal quality detection, the UE needs to detect the signal quality of some or all transmitter antennas in a neighboring cell. In the related art, a base station of a neighboring cell sends pilot measurement information through time-frequency resource blocks corresponding to each of the antennas. The UE receives the pilot measurement information transmitted in the time-frequency resource blocks, and determines the signal quality of the transmitter antennas in the neighboring cell according to the pilot measurement information.

The time-frequency resource blocks being used to transmit the pilot measurement information can also be used to transmit communication data. The UE cannot judge what transmitted in the time-frequency resource blocks is pilot measurement information or not. Since the transmitting power of the communication data and that of the pilot measurement information are different, if the time-frequency resource blocks which should have been used to transmit the pilot measurement information is used to transmit the communication data, the signal quality detection result obtained by the UE would be inaccurate, resulting in inaccurate detection result of signal quality of the entire neighboring cell.

SUMMARY

According to a first aspect, a method of processing antenna configuration information is provided. A base station encodes antenna configuration information of a neighboring cell of a first cell; and sends encoded information relating to the antenna configuration information of the neighboring cell to a user equipment (UE). The UE is capable of communicating with the base station in the first cell. The UE receives the encoded information; decodes the antenna configuration information of the neighboring cell from the encoded information; and performs determination of predetermined time-frequency resource according to the antenna configuration information of the neighboring cell. The predetermined time-frequency resource is used by a base station of the neighboring cell for transmitting pilot measurement information.

According to a second aspect, a system is provided. The system includes a base station and a user equipment (UE). The UE is capable of communicating with the base station in a first cell of the base station. The base station is configured to encode antenna configuration information of a neighboring cell of the first cell, and send encoded information relating to the antenna configuration information of the neighboring cell to the UE. The UE is configured to receive the encoded information, decode the antenna configuration information of the neighboring cell from the encoded information, and perform determination of predetermined time-frequency resource according to the antenna configuration information of the neighboring cell. The predetermined time-frequency resource is used by a base station of the neighboring cell for transmitting pilot measurement information.

According to a third aspect, a method of processing antenna configuration information is provided. A user equipment (UE) receives encoded information relating to antenna configuration information of a neighboring cell of a first cell. The UE is capable of communicating with a base station in the first cell. The UE decodes the antenna configuration information of the neighboring cell from the encoded information, and performs determination of predetermined time-frequency resource according to the antenna configuration information of the neighboring cell. The predetermined time-frequency resource is used by a base station of the neighboring cell for transmitting pilot measurement information.

According to a fourth aspect, a UE is provided. The UE includes a memory coupled to a processor. The processor is configured to execute the instructions retained in the memory. The instructions relate to: the UE receiving encoded information relating to antenna configuration information of a neighboring cell of a first cell, the UE being capable of communicating with a base station in the first cell, the UE decoding the antenna configuration information of the neighboring cell from the encoded information, and the UE performing determination of predetermined time-frequency resource according to the antenna configuration information of the neighboring cell. The predetermined time-frequency resource is used by a base station of the neighboring cell for transmitting pilot measurement information.

According to a fifth aspect, a method of processing antenna configuration information is provided. A base station encodes antenna configuration information of a neighboring cell of a first cell. The base station is capable of communicating with a user equipment (UE) in the first cell. The base station sends encoded information relating to the antenna configuration information of the neighboring cell to the UE. The antenna configuration information of the neighboring cell is designated for utilization by the UE for determination of predetermined time-frequency resource.

The predetermined time-frequency resource is used by a base station of the neighboring cell for transmitting pilot measurement information.

According to a sixth aspect, a base station is provided. The base station includes a memory coupled to a processor. The processor is configured to execute the instructions retained in the memory. The instructions relate to: the base station encoding antenna configuration information of a neighboring cell of a first cell, the base station being capable of communicating with a user equipment (UE) in the first cell, and the base station sending encoded information relating to the antenna configuration information of the neighboring cell to the UE. The antenna configuration information of the neighboring cell is designated for utilization by the UE for determination of predetermined time-frequency resource. The predetermined time-frequency resource is used by a base station of the neighboring cell for transmitting pilot measurement information.

Based on various embodiments of the present invention, a network entity at the network side is able to send antenna configuration information of a neighboring cell to a UE. The antenna configuration information may be presented in terms of antenna quantity, so that the UE is able to accurately determine the quantity of the antennas in the neighboring cell according to the antenna configuration information of the neighboring cell, and according to the quantity of the antennas, judge whether the information transmitted in the time-frequency resource blocks corresponding to the antennas is the pilot measurement information or not. In this way, the UE is enabled to accurately determine the signal quality of the neighboring cell according to the pilot measurement information transmitted in the time-frequency resource blocks, so as to solve the problem in the related art that the UE cannot judge whether the information transmitted in the time-frequency resource blocks is the pilot measurement information or communication data. The present invention solves the problem of the inaccurate detection result of the signal quality of the neighboring cell if the communication data is transmitted in the time-frequency resource blocks.

DETAILED DESCRIPTION OF THE EMBODIMENTS

In order to solve the problem that a UE cannot accurately detect signal quality of a neighboring cell because the UE cannot judge whether information transmitted in a time-frequency resource block is pilot measurement information or not, embodiments of the present invention are disclosed. The embodiments are directed to methods and devices for sending and acquiring antenna configuration information.

Figure 1:
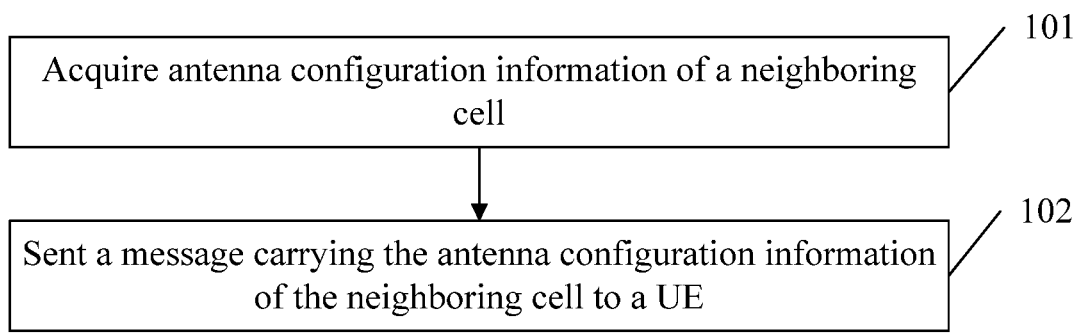
FIG. 1 is a flow chart of a method for sending information according to an embodiment of the present invention.

As shown in FIG. 1, the method for sending information according to an embodiment of the present invention includes:

Step 101: Acquire antenna configuration information of a neighboring cell.

Step 102: Send a message carrying the antenna configuration information of the neighboring cell to the UE.

The method may be performed by a base station of the current cell which is serving the UE or a core network entity.

The antenna configuration information may be presented, e.g. in terms of antenna quantity in the neighboring cell.

Using the method for sending information according to the embodiment of the present invention, the antenna configuration information of the neighboring cell is sent to the UE, so that the UE is able to accurately obtain the quantity of antennas in the neighboring cell according to the antenna configuration information. Because a base station of the neighboring cell determines which time-frequency resource blocks corresponding to each of the antennas send pilot measurement information according to the quantity of the antennas used by the cell, if the UE knows the quantity of the antennas used by the neighboring cell, it can determine which time-frequency resource blocks corresponding to each of the antennas would send the pilot measurement information. In this way, the UE is enabled to accurately detect the signal quality of the neighboring cell according to the pilot measurement information transmitted in the time-frequency resource blocks, so as to solve the problem in the related art that the UE cannot judge whether the information transmitted in the time-frequency resource blocks is the pilot measurement information or communication data, resulting in inaccurate detection result of the signal quality of the neighboring cell when the information transmitted in the time-frequency resource blocks is the communication data.

Figure 2:
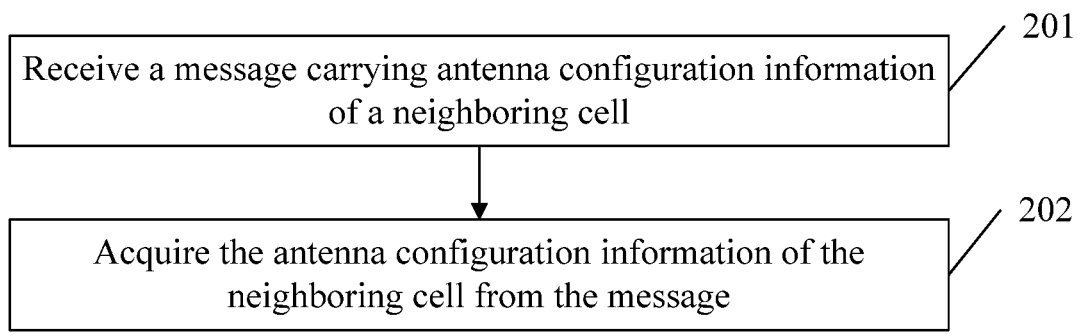
FIG. 2 is a flow chart of a method for acquiring information according to an embodiment of the present invention.

Corresponding to the method shown in FIG. 1, as shown in FIG. 2, a method for acquiring antenna configuration information is provided in an embodiment of the present invention. The method includes:

Step 201: Receive a message carrying antenna configuration information of a neighboring cell.

Step 202: Acquire the antenna configuration information of the neighboring cell from the message.

Using the method for acquiring information according to the embodiment of the present invention, a UE in a current cell is able to receive a message carrying antenna configuration information of a neighboring cell, and acquire the antenna configuration information of the neighboring cell from the message. The antenna configuration information may be presented in terms of antenna quantity of the neighboring cell, so that the UE is able to accurately acquire the quantity of the antennas in the neighboring cell according to the antenna configuration information, and according to the quantity of the antennas, judge whether information transmitted in time-frequency resource blocks corresponding to the antennas is pilot measurement information or not. In this way, the UE is enabled to accurately detect the signal quality of the neighboring cell according to the pilot measurement information transmitted in the time-frequency resource blocks, so as to solve the problem in the related art that the UE cannot judge whether information transmitted in the time-frequency resource blocks is the pilot measurement information or communication data, resulting in inaccurate detection result of the signal quality of the neighboring cell if the information transmitted in the time-frequency resource blocks is communication data.

In order to enable persons skilled in the art to more clearly understand the technical solutions according to the embodiments of the present invention, a method for sending and acquiring information according to an embodiment of the present invention is illustrated in details by means of concrete embodiments thereinafter.

Figure 3:
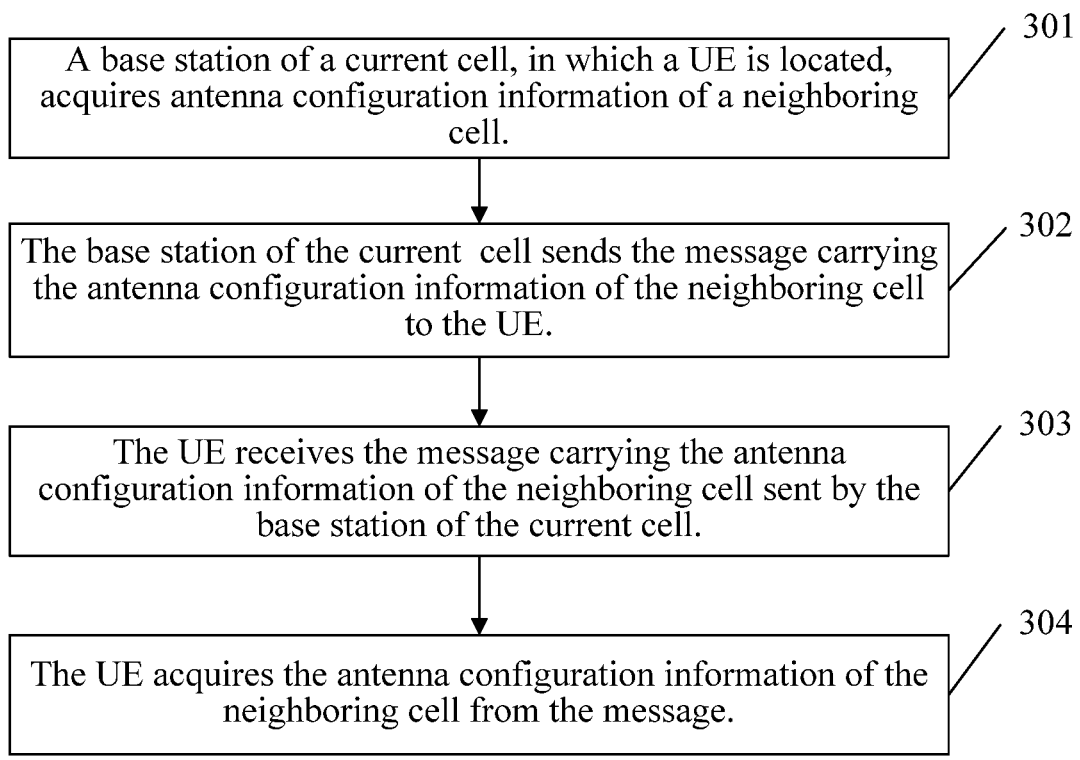
FIG. 3 is a flow chart of a method for sending and acquiring information according to an embodiment of the present invention.

As shown in FIG. 3, a method for sending and acquiring information is provided in an embodiment of the present invention, which includes:

Step 301: A base station of a current cell in which a UE is located acquires antenna configuration information of a neighboring cell.

The antenna configuration information may be the quantity of the antennas in the neighboring cell. The quantity of the antennas may be the same as the actual number of antennas owned by the neighboring cell, or different. When the quantity of the antennas is different from the actual number of the antennas, the quantity of the antennas is the number of the antennas in the neighboring cell to be measured by the UE according to the need of the network side, or the minimal quantity of the antennas in the neighboring cell.

In the embodiment, when intending to acquire the antenna configuration information of the neighboring cell, the base station of the current cell in which the UE is located may send a message to a core network entity or a base station of the neighboring cell requesting to acquire the antenna configuration information of the neighboring cell, receive a message carrying the antenna configuration information of the neighboring cell returned from the core network entity or the base station of the neighboring cell, and acquire the antenna configuration information of the neighboring cell from the message. Alternatively, the base station of the current cell in which the UE is located may also receive a message carrying the antenna configuration information of the neighboring cell actively sent by the core network entity or the base station of the neighboring cell, and acquire the antenna configuration information of the neighboring cell from the message. For example, when the base station of the current cell in which the UE is located establishes a connection to the core network, the core network may actively send a message carrying the antenna configuration information of the neighboring cell to the base station. The base station receives the message and acquires the antenna configuration information of the neighboring cell from the message. Another example is, when changes occur in the base station or the structure of the network of the neighboring cell, the core network or the base station of the neighboring cell may actively send a message carrying the configuration information of the antennas in the neighboring cell. The base station of the current cell receives the message and acquires the antenna configuration information of the neighboring cell from the message. Of course, during the practical use, the base station of the current cell may also acquire the antenna configuration information of the neighboring cell through various other manners, and details of which are not repeated here.

Step 302: The base station of the current cell sends the message carrying the antenna configuration information of the neighboring cell to the UE.

In the embodiment, the message carrying the antenna configuration information of the neighboring cell may be a system message, or may be a dedicated signaling, such as a radio resource control connection reconfiguration (RRC Connection Reconfiguration) message, a radio resource control connection setup (RRC Connection Setup) message, or a radio resource control connection re-establishment (RRC Connection Re-establishment) message.

If the message carrying the antenna configuration information of the neighboring cell is a dedicated signaling, for the UE in an idle state, the base station of the current cell may send the dedicated signaling carrying the antenna configuration information of the neighboring cell to the UE according to the message after receiving the message requesting for the antenna configuration information of the adjacent cell sent by the UE; for the UE in a connected state, the base station of the current cell may actively send the dedicated signaling carrying the antenna configuration information of the neighboring cell to the UE.

It should be noted that, after establishing a connection to the base station of the current cell, the UE will not actively receive system messages sent by the base station. Thus, if the message carrying the antenna configuration information of the neighboring cell sent to the UE by the base station of the current cell is a system message, in order to enable the UE to receive the system message, the step 302 may further include a step that the base station of the current cell sends a paging message to the UE, instructing the UE to receive the system message carrying the antenna configuration information of the neighboring cell.

In the embodiment, if antenna configurations of all neighboring cells are the same or approximately the same, the antenna configuration information of the neighboring cell is called comprehensive antenna configuration information, which comprehensively represents the antenna configurations of all the neighboring cells. If antenna configurations are the same, such as the antenna quantity is 4, the comprehensive antenna configuration information directly corresponds to 4. If antenna configuration information is approximate, such as the antenna quantity is 2 for some cells, the antenna quantity is 4 for other cells, in order to save resources, the comprehensive antenna configuration information may correspond to a smaller value, that is 2. This means the network side intends the UE to measure only two antennas.

The comprehensive antenna configuration information may be encoded according to a preset encoding principle and carried in a field of the system message or a dedicated signaling. The encoding principle may include various types. For example, when the comprehensive antenna configuration of all the neighboring cells is 1, 2 or 4, the encoding principle may be encoding the comprehensive antenna configuration of all the neighboring cells with 2 bit, wherein 00 represents the comprehensive antenna configuration is 1, 01 represents the comprehensive antenna configuration is 2, 10 represents the comprehensive antenna configuration is 4, and 11 represents the comprehensive antenna configuration is undetermined. Alternatively, the encoding principle may be encoding the comprehensive antenna configuration information of all the neighboring cells with 1 bit. Wherein 0 represents the comprehensive antenna configuration is 1 or 2, in this case, the UE needs to determine whether it is 1 or 2; 1 represents the comprehensive antenna configuration is 4. In this embodiment of the present invention, the details are not repeated here.

If antenna configurations of the neighboring cells are different or partially different from one another, the antenna configuration information of the neighboring cell is antenna configuration information corresponding to that neighboring cell. The antenna configuration information may be carried in a neighboring cell list of the system message or dedicated signaling in the form of encoding according to a preset encoding principle. As shown in table 1, a field of antenna information count (AntennaInformationCount) is added in the neighboring cell list, and the antenna configuration information of each neighboring cell is carried in the field.

TABLE 1

```
...
NeighCellsToAddModifyList::=SEQUENCE(SIZE(1..
maxCellMeas)) OF SEQUENCE {
    ...
    AntennaInformationCount    ENUMERATED {N}
}
...
```

In the above Table 1, the ENUMERATED {N} represents the quantity of antennas in each neighboring cell. The quantity of the antennas may be encoded according to a preset encoding principle. For example, when the antenna configuration of a neighboring cell is 1, 2 or 4, the encoding principle may be encoding the antenna configuration information of each neighboring cell with 2 bit, wherein 00 represents the antenna configuration of 1, 01 represents the antenna configuration of 2, 10 represents the antenna configuration of 4, and 11 represents empty. Alternatively, the encoding principle may also be encoding the antenna configuration information of each neighboring cell with 1 bit, wherein 0 represents the antenna configuration of 1 or 2; 1 represents the antenna configuration of 4. In the embodiment of the present invention, the details are not repeated here.

In the embodiment, the system message or dedicated signaling may only carry a field of the comprehensive antenna configuration information or a neighboring cell list. The system message or dedicated signaling may also carry both the field of the comprehensive antenna configuration information and the neighboring cell list, in this case, if antenna configurations of all neighboring cells are the same or approximately the same, the field of the AntennaInformationCount in the neighboring cell list is empty. If antenna configurations of the neighboring cell are different or partially different from one another, the field of the comprehensive antenna configuration information is set to be undetermined of the comprehensive antenna configuration (as represented by the code 11), and the detailed antenna configuration information of the neighboring cell is carried in the neighboring cell list.

Step 303: The UE receives the message carrying the antenna configuration information of the neighboring cell sent by the base station of the current cell.

In the embodiment, if the message carrying the antenna configuration information is a dedicated signaling, the UE may directly receive the message carrying the antenna configuration information of the neighboring cell from the base station of the current cell. If the message carrying the antenna configuration information of the neighboring cell is a system message, the UE may receive a corresponding field of the system message. When the antenna configuration of a neighboring cell changes, the UE may at first receive a paging message sent by a base station, and receive a message carrying antenna configuration information of a neighboring cell according to the paging message.

Step 304: The UE acquires the antenna configuration information of the neighboring cell from the message, including:

At first, the UE acquires a decoding principle of the antenna configuration information.

In the embodiment, the UE may send a message requesting for the decoding principle of the antenna configuration information to the base station of the current cell, receive a response message returned by the base station, and acquire the decoding principle of the antenna configuration information from the response message. The UE may also acquire the decoding principle of the antenna configuration information from the system message or dedicated signaling actively sent from the base station of the current cell. The UE may further acquire the decoding principle of the antenna configuration information from a pre-stored base station information list according to indication information sent by the base station of the current cell. For example, when the base station of the current cell sends the message carrying the antenna configuration information of the neighboring cell to the UE, the base station may carry the indication information in the message, and the UE receives the message carrying the antenna configuration information of the neighboring cell, acquires the indication information from the message, and then acquires, according to the indication information, the decoding principle of the antenna configuration information from the pre-stored base station information list. The UE may not need the indication from the base station, and performs decoding according to a default decoding principle. Of course, during the practical use, the UE may acquire the decoding principle of the antenna configuration information by means of other manners. Here, the details are not repeated.

Next, according to the decoding principle of the antenna configuration information, the UE decodes the message carrying the antenna configuration information of the neighboring cell, so as to acquire and/or store the antenna configuration information of the neighboring cell.

In the embodiment, the message carrying the antenna configuration information of the neighboring cell may only carry a field of the comprehensive antenna configuration information. In this case, according to the decoding principle, the UE may decode the field of the comprehensive antenna configuration information to acquire the comprehensive antenna configuration information of all the neighboring cells. The decoding principle may include various types. For example, when the antenna configuration of a neighboring cell is 1, 2 or 4, and the field of the comprehensive antenna configuration information is 2 bit, the decoding principle may be: code 00 represents the comprehensive antenna configuration of 1, code 01 represents the comprehensive antenna configuration of 2, code 10 represents the comprehensive antenna configuration of 4, and code 11 represents the comprehensive antenna configuration is undetermined. Further, when the antenna configuration of a neighboring cell is 1, 2, or 4, and the field of the comprehensive antenna configuration information is 1 bit, the decoding principle may be: code 0 represents the comprehensive antenna configuration of 1 or 2, and code 1 represents the comprehensive antenna configuration of 4. In this case, if the field of the comprehensive antenna configuration information is 1, the UE needs to further determine whether the antenna configuration is 1 or 2 according to a pilot design principle.

The message carrying the antenna configuration information of the neighboring cell may also only carry the neighboring cell list. In this case, according to the decoding principle, the UE may decode the neighboring cell list to acquire the antenna configuration information corresponding to each neighboring cell. The decoding principle may include various types. The details may be seen by reference to the above decoding principle and is not repeated here.

The message carrying the antenna configuration information of the neighboring cell may also carry both the field of the comprehensive antenna configuration information and the neighboring cell list. In this case, according to the decoding principle, the UE may decode the field of the comprehensive antenna configuration information and the neighboring cell list respectively, so as to acquire the antenna configuration information of each neighboring cell. In more details, according to the decoding principle, the UE decodes the field of the comprehensive antenna configuration information to acquire the comprehensive antenna configuration information of the neighboring cell from the field. If the decoding result of the field of the comprehensive antenna configuration information shows that the comprehensive antenna configuration in undetermined, the UE then decodes the neighboring cell list to acquire the antenna configuration information corresponding to each neighboring cell from the neighboring cell list.

In the embodiment, after the UE has acquired the antenna configuration information of the neighboring cell, the UE may detect the signal quality of the neighboring cell according to the antenna configuration information. In an actual detection process, because the UE is not under the coverage of some antennas in the neighboring cell, or it does not receive pilot measurement information sent by some antennas, the UE may not be able to detect the signal quality completely according to the acquired antenna configuration information of the neighboring cell. In order to enable the base station of the current cell to accurately obtain the antenna configuration the UE uses to detect the signal quality of the neighboring cell, the UE may send to the base station of the current cell the antenna configuration information of the neighboring cell it uses to detect the signal quality. In detail, when the UE reports the detection result of the signal quality of the neighboring cell to the base station of the current cell, the UE may carry the antenna configuration information of the neighboring cell it uses to detect the signal quality, such as the quantity of the actually used/unused antennas, or the sequence number of the used/unused antennas, in the detection result. The UE may send antenna configuration information of the neighboring cell it uses to detect the signal quality by means of a separate message. Here, the details are not repeated.

For the method for sending and acquiring information according to the embodiment of the present invention, a network side entity is able to send the antenna configuration information of the neighboring cell to the UE, so that the UE is able to accurately know the quantity of the antennas in the neighboring cell according to the antenna configuration information of the neighboring cell, and judge whether the information transmitted in the time-frequency resource blocks corresponding to the antennas is the pilot measurement information or not according to the quantity of the antennas. In this way, the UE is enabled to accurately detect the signal quality of the neighboring cell according to the pilot measurement information transmitted in the time-frequency resource blocks, so as to solve the problem in the related art that the UE cannot judge whether the information transmitted in the time-frequency resource blocks is the pilot measurement information or not, which results in inaccurate detection result of the signal quality of the neighboring cell if the information transmitted in the time-frequency resource blocks is communication data.

Figure 4:
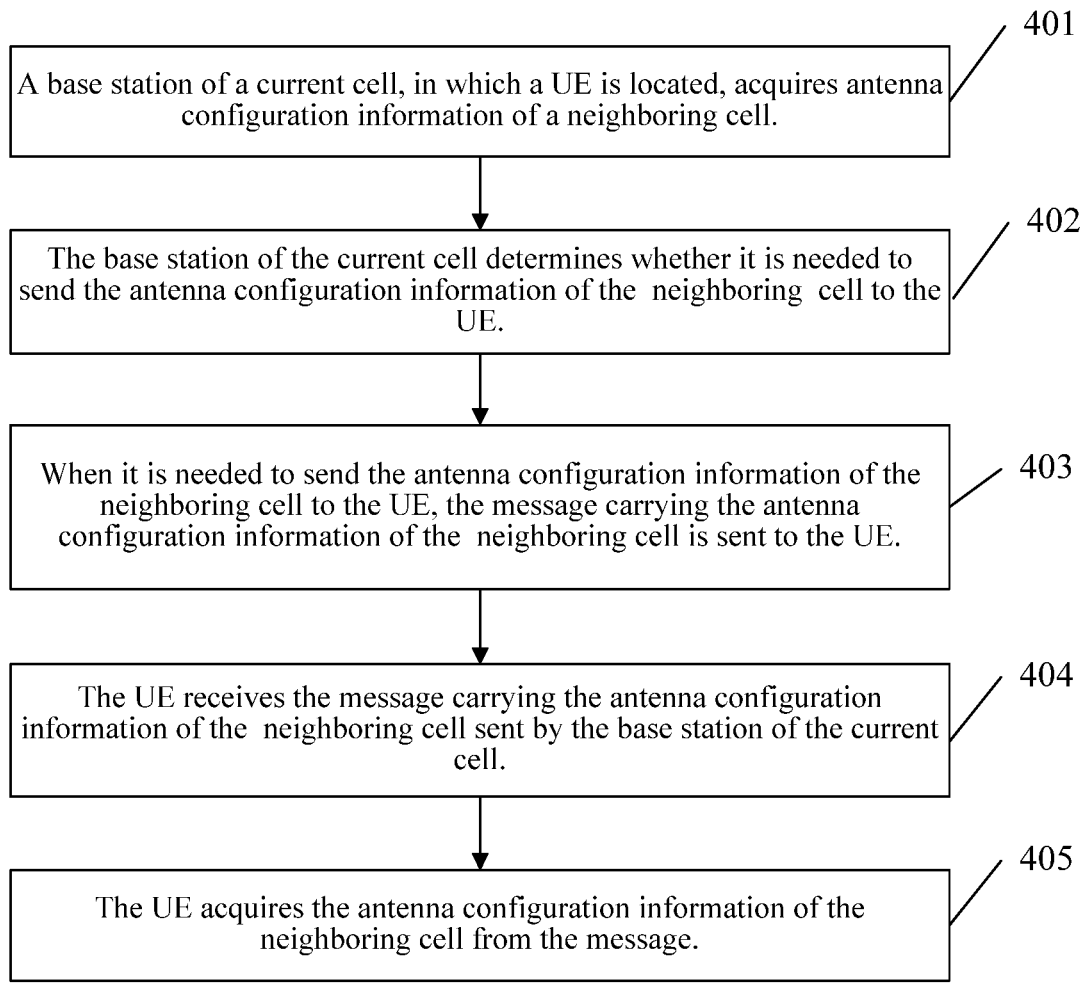
FIG. 4 is a flow chart of a method for sending and acquiring information according to another embodiment of the present invention.

As shown in FIG. 4, a method for sending and acquiring information according to another embodiment of the present invention is provided, which includes:

Step 401: A base station of a current cell, in which a UE is located, acquires antenna configuration information of a neighboring cell. The detailed implementation method of acquiring the antenna configuration information may be seen by reference to the step 301 shown in FIG. 3, and is not repeated here.

Step 402: The base station of the current cell determines whether it is needed to send the antenna configuration information of the neighboring cell acquired in the step 401 to the UE or not. The determination includes one of the following three determination methods.

In a first method, the base station of the current cell determines whether or not to send the antenna configuration information of the neighboring cell acquired in the step 401 to the UE according to a pilot design principle.

In an embodiment, when the antenna configuration information is 1, 2 or 4, the pilot design principle is as follows:

If the quantity of the antennas in the cell is 1, the pilot measurement information having a pilot symbol of 0 is sent in a time-frequency resource block corresponding to an antenna port 0, the time-frequency resource block corresponding to an antenna port 1 is empty, and the time-frequency resource block corresponding to an antenna port 2 and the time-frequency resource block corresponding to an antenna port 3 may be empty or may be used to send communication data.

If the quantity of the antennas in the cell is 2, the pilot measurement information having a pilot symbol of 0 is sent in a time-frequency resource block corresponding to the antenna port 0, the pilot measurement information having a pilot symbol of 1 is sent in a time-frequency resource block corresponding to the antenna port 1, the time-frequency resource block corresponding to the antenna port 2 and the time-frequency resource block corresponding to the antenna port 3 may be empty or may be used to send communication data.

If the quantity of the antennas in the cell is 4, the pilot measurement information having a pilot symbol of 0 is sent in a time-frequency resource block corresponding to the antenna port 0, the pilot measurement information having a pilot symbol of 1 is sent in a time-frequency resource block corresponding to the antenna port 1, the pilot measurement information having a pilot symbol of 2 is sent in a time-frequency resource block corresponding to the antenna port 2, and the pilot measurement information having a pilot symbol of 3 is sent in a time-frequency resource block corresponding to the antenna port 3.

It can be seen that according to the above pilot design principle, the UE can accurately determine the antenna configuration information of the neighboring cell of which the quantity of the antennas is 1 by detecting whether the time-frequency resource block corresponding to antenna port 1 is empty.

If one of the time-frequency resource block corresponding to the antenna port 2 and the time-frequency resource block corresponding to the antenna port 3 is necessarily empty, the UE can also accurately know whether the antenna configuration information of the neighboring cell of which the quantity of the antennas is 2 by detecting whether time-frequency resource block corresponding to antenna port 1 is empty. In this case, the base station of the current cell can determine to only send the antenna configuration information of the neighboring cell with antenna quantity 4 to the UE.

However, both the time-frequency resource block corresponding to the antenna port 2 and the time-frequency resource block corresponding to the antenna port 3 may not be empty, and may both be used to send communication data. In this case, the UE cannot determine the antenna configuration information of the neighboring cell with the antenna quantity of 2 by detecting the time-frequency resource block corresponding to the antenna port 1. In this case, the base station still needs to send the antenna configuration information of the neighboring cell with antenna quantity 2 and/or 4 to the UE. If the base station only sends the antenna configuration information of 4, and if the UE has not received the antenna configuration information, it is needed at first to judge whether the quantity of the antennas is 1. If not, it is determined to be 2, and vice versa.

In a second method, according to a relation between a type of the neighboring cell and a type of the current cell, the base station of the current cell determines whether to send the antenna configuration information of the neighboring cell acquired in the step 401 to the UE or not.

The type of the cell refers to the quantity of the antennas the cell has. If the type of the neighboring cell and the type of the current cell are the same, the quantity of the antennas in the neighboring cell and the quantity of the antennas in the current cell are equal, then the base station of the current cell does not send the antenna configuration information of the neighboring cell acquired in the step 401 to the UE; otherwise, the base station of the current cell sends the antenna configuration information of the neighboring cell acquired in the step 401 to the UE. For example, when the antenna configuration of neighboring cells are 1, 2 or 4, and the quantity of the antennas in the current cell is 4, the base station of the current cell only sends to the UE the antenna configuration information of the neighboring cells of which the quantity of the antennas is 1 or 2.

In a third method, according to a pilot design principle and a relation between a type of the neighboring cell and a type of the current cell, the base station of the current cell determines whether to send the antenna configuration information of the neighboring cell acquired in the step 401 to the UE or not.

For example, when the antenna configuration of a neighboring cell is 1, 2 or 4, and the quantity of the antennas in the current cell is 4, according to the pilot design principle and the relation between the type of the neighboring cell and the type of the current cell, the base station of the current cell may determine to only send the antenna configuration information of the neighboring cell of which the quantity of the antennas is 2 to the UE.

Of course, in the practical use process, the base station of the current cell may also determine whether to send the antenna configuration information of the neighboring cell acquired in the step 401 to the UE according to other preset sending principles. For example, when the antenna configuration of a neighboring cell is 1, 2 or 4, a sending principle may be set to only send the antenna configuration information of the neighboring cell of which the quantity of the antennas is 2 and 4, but not send the antenna configuration information of the neighboring cell of which the quantity of the antennas is 1. Here, the details are not repeated.

Step 403: When it is needed to send the antenna configuration information of the neighboring cell to the UE, the base station of the current cell sends a message carrying the antenna configuration information of the neighboring cell to the UE. The detailed implementation method is basically the same as in the step 302 shown in FIG. 3, and the difference is described as follows.

The base station of the current cell may encode the antenna configuration information of the neighboring cell in the manner of antenna configuration information sending indication according to the sending principle in the step 402. For example, when the sending principle corresponds to the pilot design principle, that is, only sending the antenna configuration information of the neighboring cell of which the quantity of the antennas is 4 to the UE, the encoding principle may include sending the antenna configuration information sending indication with 1 bit, in which 0 represents that the antenna configuration information of the neighboring cell is not sent, and 1 represents that the antenna configuration information of the neighboring cell is sent.

Of course, the base station of the current cell may also use the same encoding principle as that in the step 302 according to the sending principle in the step 402. For example, where the antenna configuration of a neighboring cell is 1, 2 or 4, when the sending principle corresponds to the principle of the relation between the type of the neighboring cell and the type of the current cell, if the quantity of the antennas in the current cell is 1, the encoding principle may include sending the antenna configuration information (including the comprehensive antenna configuration information of all neighboring cells, or the antenna configuration information corresponding to each neighboring cell) of the neighboring cell with 1 bit, in which 0 represents that the antenna configuration is 2, and 1 represents that the antenna configuration is 4. If the quantity of the antennas in the current cell is 2, 0 represents that the antenna configuration is 1, and 1 represents that the antenna configuration is 4. If the quantity of the antennas in the current cell is 4, 0 represents that the antenna configuration is 1, and 1 represents that the antenna configuration is 2. If antenna configurations of the neighboring cells are different or partially different from one cell to another, in order to save the expenses of the system message or dedicated signaling, according to a preset encoding principle, the antenna configuration information corresponding to each neighboring cell may also be carried in a newly added neighboring cell antenna configuration information list of the system message or a dedicated signaling in the form of encoding. The list may carry identity information of the neighboring cell (such as cell index, or cell ID, or frequency point information of the neighboring cell), or the quantity information of the antennas in the neighboring cell. The information carried in the newly added neighboring cell antenna configuration information list may be set according to the sending principle in the step 402, and may also be set according to the encoding principle. For example, as shown in table 2, when the sending principle in the step 402 corresponds to the pilot design principle, and only the antenna configuration information of the neighboring cell of which the quantity of the antennas is 4 is sent, the neighboring cell antenna configuration information list may carry the neighboring cell identity of the antenna configuration information (cellIndex and cellIdentity) needed to be sent. In this case, it is not needed to carry the quantity information of the antennas or the quantity indication of the antennas.

TABLE 2

```
NeighCells AntennaInformationList N4:=SEQUENCE
(SIZE (1..maxCellMeas)) OF
SEQUENCE {
    cellIndex           INTEGER (1..maxCellMeas),
    cellIdentity        PhysicalCellIdentity,
}
......
```

Step 404: The UE receives the message carrying the antenna configuration information of the neighboring cell sent by the base station of the current cell. The detailed implementation method can be seen by reference to the step 303 shown in FIG. 3, and is not repeated here.

Step 405: The UE acquires the antenna configuration information of the neighboring cell from the message. The detailed implementation method is basically the same as the step 304 shown in FIG. 3, and the difference is described as follows.

When the UE does not obtain the antenna configuration information of a certain or some neighboring cells from the message carrying the antenna configuration information of the neighboring cell acquired in the step 404, the UE acquires the antenna configuration information of the neighboring cell according to a principle by which the base station of the current cell sends the antenna configuration information of the neighboring cell. The process includes the following.

At first, the UE acquires a principle by which the base station of the current cell sends the antenna configuration information of the neighboring cell.

In this embodiment, the UE may send a message requesting for the sending principle of the antenna configuration information of the neighboring cell to the base station of the current cell, receive a response message from the base station, and acquire the principle by which the base station sends the antenna configuration information of the neighboring cell from the response message. The UE may also acquire, from the system messages or dedicated signalings actively sent by the base station of the current cell, the sending principle by which the base station sends the antenna configuration information of the neighboring cell. The UE may further acquire, according to indication information sent by the base station of the current cell, a principle by which the base station sends the antenna configuration information of the neighboring cell from a pre-stored base station information list. For example, when the base station of the current cell sends the message carrying the antenna configuration information of the neighboring cell to the UE, the indication information may be carried in the message. The UE receives the message carrying the antenna configuration information of the neighboring cell, and acquires the indication information from the message. According to the indication information, a principle by which the base station sends the antenna configuration information of the neighboring cell is acquired from the pre-stored base station information list. The UE may not need the indication from the base station, and performs decoding according to a default decoding principle. Of course, in the practical use process, the UE may also acquire information of a principle by which the base station sends the antenna configuration information of the neighboring cell by other manners. Here, the details are not repeated.

Next, the UE acquires the antenna configuration information of the neighboring cell which has not been received in the step 404 according to the principle by which the base station sends the antenna configuration information of the neighboring cell, including the following.

If the principle by which the base station sends the antenna configuration information of the neighboring cell corresponds to the aforementioned pilot design principle, and only the antenna configuration information of the neighboring cell of which the quantity of the antennas is 4 is sent, the UE detects whether the time-frequency resource block corresponding to antenna port 1 is empty. If it is empty, the antenna configuration information of the neighboring cell is 1; otherwise, it is 2. Alternatively, if the principle by which the base station sends the antenna configuration information of the neighboring cell corresponds to the pilot design principle, and only the antenna configuration information of the neighboring cell of which the quantity of the antennas is 2 is sent, the UE detects whether the time-frequency resource block corresponding to antenna port 1 is empty. If it is empty, the antenna configuration information of the neighboring cell is 1; otherwise, it is 4.

If the principle by which the base station sends the antenna configuration information of the neighboring cell corresponds to the relation between the type of the neighboring cell and the type of the current cell, the UE acquires antenna configuration information of the current cell, and obtains the antenna configuration information of the neighboring cell which is not included in the neighboring cell list according to the information. The antenna configuration information of the current cell may be obtained from the system message or dedicated signaling.

If the principle by which the base station sends the antenna configuration information of the neighboring cell corresponds to the pilot design principle and the relation between the type of the neighboring cell and the type of the current cell, the UE at first detects whether the time-frequency resource block corresponding to antenna port 1 is empty. If it is empty, the antenna configuration information of the neighboring cell is 1; otherwise, the UE acquires the antenna configuration information of the current cell. The antenna configuration information of the neighboring cell is the same as the antenna configuration information of the current cell.

In this embodiment, the UE may also send antenna configuration information of the neighboring cell used to detect the signal quality to the base station of the current cell. The detailed implementation process can be seen by reference to the embodiment shown in FIG. 3, and is not repeated here.

For the method for sending and acquiring information according to this embodiment of the present invention, the network side is able to send the antenna configuration information of the neighboring cell to the UE, so that the UE is able to accurately determine the quantity of the antennas in the neighboring cell according to the antenna configuration information of the neighboring cell, and judge whether the information transmitted in the time-frequency resource blocks corresponding to the antennas is the pilot measurement information or not according to the quantity of the antennas. In this way, the UE is enabled to accurately detect the signal quality of the neighboring cell according to the pilot measurement information transmitted in the time-frequency resource blocks, so as to solve the problem in the related art that the UE cannot judge whether the information transmitted in the time-frequency resource blocks is the pilot measurement information or not, which results in inaccurate detection result of the signal quality of the neighboring cell acquired according to the information when the information transmitted in the time-frequency resource blocks is communication data. Because the network side can selectively send the antenna configuration information of the neighboring cell to the UE according to the pilot design principle and/or the relation between the type of the neighboring cell and the type of the current cell, communication resources occupied by sending the antenna configuration information of the neighboring cell can be reduced, and system expenses can be saved.

Figure 5:
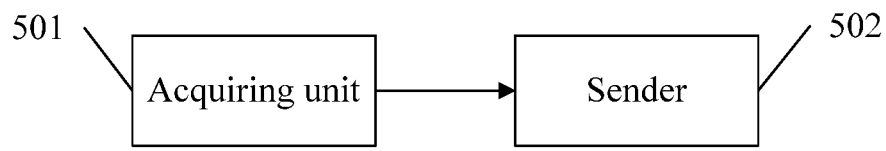
FIG. 5 is a block diagram of a base station according to an embodiment of the present invention.

Corresponding to the above methods, as shown in FIG. 5, a base station according to an embodiment of the present invention is further provided, which includes:

An acquiring unit 501, which is configured to acquire antenna configuration information of a neighboring cell.

A sender 502, which is configured to send a message carrying the antenna configuration information of the neighboring cell to a UE.

The sender 502 may further be configured to send a message requesting to acquire the antenna configuration information of the neighboring cell to a core network entity or a base station of the neighboring cell.

The acquiring unit 501 may further be configured to receive a message carrying the antenna configuration information of the neighboring cell from the core network entity or the base station of the neighboring cell.

Alternatively, the acquiring unit 501 may further be configured to receive a message carrying the antenna configuration information of the neighboring cell sent by the core network entity when establishing a connection to the core network.

Figure 6:
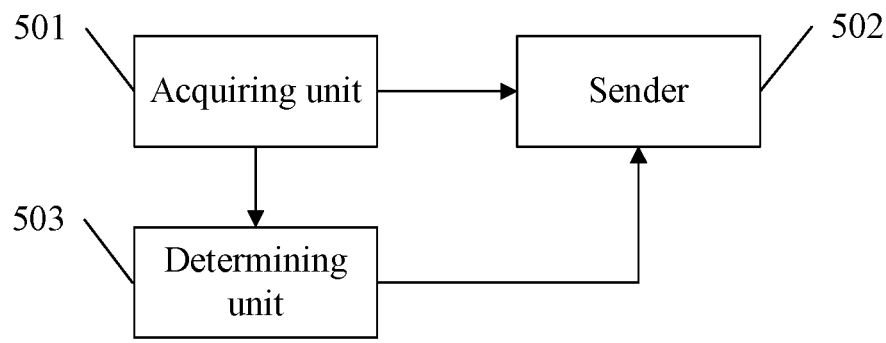
FIG. 6 is a block diagram of a base station according to another embodiment of the present invention.

Further, as shown in FIG. 6, the base station may further include:

A determining unit 503, which is configured to determine whether to send the antenna configuration information of the neighboring cell to the UE.

The base station according to the embodiment of the present invention is able to send the antenna configuration information of the neighboring cell to the UE, so that the UE is able to accurately obtain the quantity of antennas in the neighboring cell according to the antenna configuration information, and determine whether the information transmitted in the time-frequency resource blocks corresponding to the antennas is the pilot measurement information or not. In this way, the UE is able to accurately measure the signal quality of the neighboring cell according to the pilot measurement information transmitted in the time-frequency resource blocks, so as to solve the problem in the related art that the UE cannot judge whether the information transmitted in the time-frequency resource blocks is the pilot measurement information or not, which results in inaccurate detection result of the signal quality of the neighboring cell when the information transmitted in the time-frequency resource blocks is communication data. Because the base station can selectively send the antenna configuration information of the neighboring cell to the UE according to a pilot design principle and/or a relation between a type of the neighboring cell and a type of a current cell, communication resources occupied by sending the antenna configuration information of the neighboring cell can be reduced, and system expenses can be saved.

Figure 7:
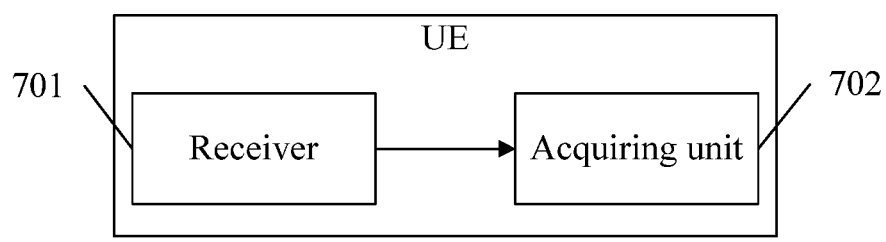
FIG. 7 is a block diagram of a UE according to an embodiment of the present invention.

As shown in FIG. 7, a UE according to an embodiment of the present invention is further provided, which includes:

A receiver 701, which is configured to receive a message carrying antenna configuration information of a neighboring cell.

An acquiring unit 702, which is configured to acquire the antenna configuration information of the neighboring cell from the received message.

The acquiring unit 702 may be further configured to acquire the antenna configuration information of the neighboring cell according to a pilot design principle and/or a relation between a type of the neighboring cell and a type of a current cell, or a preset sending principle.

Figure 8:
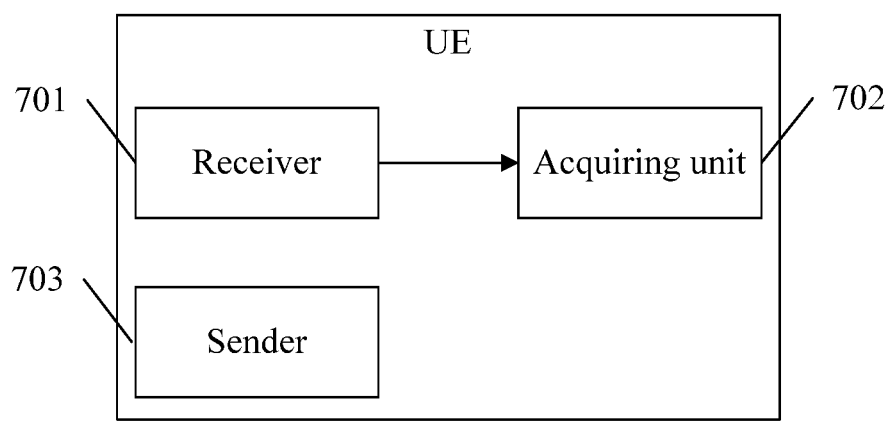
FIG. 8 is a block diagram of a UE according to another embodiment of the present invention.

Further, as shown in FIG. 8, the UE may include:

A sender 703, which is configured to send antenna configuration information of the neighboring cell used to detect signal quality.

The UE according to the embodiment of the present invention is able to receive a message carrying the antenna configuration information of the neighboring cell, and acquire the antenna configuration information of the neighboring cell from the message, so that the UE is able to accurately determine the quantity of the antennas in the neighboring cell according to the antenna configuration information, and judge whether the information transmitted in the time-frequency resource blocks corresponding to the antennas is the pilot measurement information or not according to the quantity of the antennas. In this way, the UE is enabled to accurately detect the signal quality of the neighboring cell according to the pilot measurement information transmitted in the time-frequency resource blocks, so as to solve the problem in the related art that the UE cannot judge whether the information transmitted in the time-frequency resource blocks is the pilot measurement information or not, which results in inaccurate detection result of the signal quality of the neighboring cell when the information transmitted in the time-frequency resource blocks is communication data.

A communication system according to an embodiment of the present invention is further provided, which includes the base stations as in FIG. 5 and FIG. 6.

For the communication system according to the embodiment of the present invention, the base station is able to send the antenna configuration information of the neighboring cell to the UE, so that the UE is able to accurately determine the quantity of antennas in the neighboring cell according to the antenna configuration information, and judge whether the information transmitted in the time-frequency resource blocks corresponding to the antennas is the pilot measurement information or not according to the quantity of the antennas. In this way, the UE is enabled to accurately detect the signal quality of the neighboring cell according to the pilot measurement information transmitted in the time-frequency resource blocks, so as to solve the problem in the related art that the UE cannot judge whether the information transmitted in the time-frequency resource blocks is the pilot measurement information or not, which results in inaccurate detection result of the signal quality of the neighboring cell when the information transmitted in the time-frequency resource blocks is communication data.

The methods, devices and system for sending and acquiring information according to the embodiments of the present invention may be applied in a wireless communication system.

Persons of ordinary skill in the art may understand that part of the steps of the methods according to the embodiments of the present invention may be implemented by a program instructing relevant hardware. The program may be stored in a computer readable storage medium, such as a read-only memory (ROM), a random access memory (RAM), a magnetic disk or a compact disk read-only memory (CD-ROM).

In conclusion, the above are merely preferred embodiments of the present invention. However, the scope of the present invention is not limited thereto. Changes or replacements readily apparent to persons skilled in the prior art within the technical scope of the present invention should fall within the scope of the present invention. Therefore, the protection scope of the present invention is subject to the appended claims.

What is claimed is:

1. A method for information transmission, comprising:
   receiving, by a terminal device in a first cell of a base station, a message comprising comprehensive antenna configuration information encoded by the base station;

obtaining, by the terminal device, comprehensive antenna configuration information through decoding the encoded comprehensive antenna configuration information in the message, wherein the comprehensive antenna configuration information indicates antenna configuration of more than one neighboring cells of the first cell; and measuring, by the terminal device, at least one neighboring cell of the more than one neighboring cells after obtaining the comprehensive antenna configuration information.

2. The method according to claim 1, further comprising:
determining, by the terminal device according to the comprehensive antenna configuration information, one or more time-frequency resource blocks for transmitting pilot measurement information.

3. The method according to claim 1, wherein the comprehensive antenna configuration information is obtained by decoding one information bit of the message.

4. The method of claim 1, wherein the comprehensive antenna configuration information indicates that a quantity of antennas in each of the more than one neighboring cells is one or two.

5. The method of claim 1, wherein the comprehensive antenna configuration information indicates a quantity of antennas to be measured by the terminal device in each of the more than one neighboring cells, wherein the quantity of antennas is determined by a network device.

6. The method of claim 1, wherein the comprehensive antenna configuration information of the more than one neighboring cells is encoded into 1 bit when comprehensive antenna configuration of the more than one neighboring cells is 1 or 2, or is encoded into 2 bits when comprehensive antenna configuration of the more than one neighboring cells is 1, 2 or 4.

7. A terminal device served by a first cell, comprising:
a processor and a memory unit storing program codes for execution by the processor;
wherein the program codes, when executed by the processor, cause the terminal device to:
receive, from a base station, a message comprising comprehensive antenna configuration information encoded by the base station;
obtain comprehensive antenna configuration information through decoding the encoded comprehensive antenna configuration information in the message, wherein the comprehensive antenna configuration information indicates antenna configuration of more than one neighboring cells of the first cell; and
measure at least one neighboring cell of the more than one neighboring cells after obtaining the comprehensive antenna configuration information.

8. The terminal device according to claim 7, wherein the program codes further cause the terminal device to:
determine, according to the comprehensive antenna configuration information, more time-frequency resource blocks for transmitting pilot measurement information.

9. The terminal device according to claim 7, wherein the comprehensive antenna configuration information is obtained by decoding one information bit of the message.

10. The terminal device according to claim 7, wherein the comprehensive antenna configuration information indicates that a quantity of antennas in each of the more than one neighboring cells is one or two.

11. The terminal device according to claim 7, wherein the comprehensive antenna configuration information indicates a quantity of antennas to be measured by the terminal device in each of the more than one neighboring cells, wherein the quantity of antennas is determined by a network device.

12. The terminal device according to claim 7, wherein the comprehensive antenna configuration information of the more than one neighboring cells is encoded into 1 bit when comprehensive antenna configuration of the more than one neighboring cells is 1 or 2, or is encoded into 2 bits when comprehensive antenna configuration of the more than one neighboring cells is 1, 2 or 4.

13. A communication system, comprising:
a base station of a first cell, and a terminal device served by the first cell;
wherein the base station is configured to:
encode comprehensive antenna configuration information, and
send a message comprising the encoded comprehensive antenna configuration information to the terminal device according to a pilot design principle, wherein the comprehensive antenna configuration information indicates antenna configuration of more than one neighboring cells of the first cell; and
wherein the terminal device is configured to:
receive the message,
obtain the comprehensive antenna configuration information through decoding the encoded comprehensive antenna configuration information in the message; and
measure at least one neighboring cell of the more than one neighboring cells after obtaining the comprehensive antenna configuration information.

14. The communication system according to claim 13, wherein the terminal device is further configured to:
determine, according to the comprehensive antenna configuration information, more time-frequency resource blocks for transmitting pilot measurement information.

15. The communication system according to claim 13, wherein the comprehensive antenna configuration information is obtained by decoding one information bit of the message.

16. The communication system according to claim 13, wherein the comprehensive antenna configuration information indicates that a quantity of antennas in each of the more than one neighboring cells is one or two.

17. The communication system of claim 13, wherein the comprehensive antenna configuration information indicates a quantity of antennas to be measured by the terminal device in each of the more than one neighboring cells, wherein the quantity of antennas is determined by a network device.

18. The communication system according to claim 13, wherein the comprehensive antenna configuration information of the more than one neighboring cells is encoded into 1 bit when comprehensive antenna configuration of the more than one neighboring cells is 1 or 2, or is encoded into 2 bits when comprehensive antenna configuration of the more than one neighboring cells is 1, 2 or 4.

19. The communication system according to claim 13, wherein the pilot design principle comprises:
when the quantity of antennas in the first cell is one, pilot measurement information having a pilot symbol of 0 is sent to the terminal device in a time-frequency resource block corresponding to an antenna port 0.

20. The communication system according to claim 13, wherein the pilot design principle comprises:
when the quantity of antennas in the first cell is two, pilot measurement information having a pilot symbol of 0 is sent to the terminal device in a time-frequency resource block corresponding to an antenna port 0, and pilot measurement information having a pilot symbol of 1 is sent to the terminal device in a time-frequency resource block corresponding to an antenna port 1.

* * * * *